US006774954B1

United States Patent
Lee

(12) United States Patent
(10) Patent No.: US 6,774,954 B1
(45) Date of Patent: Aug. 10, 2004

(54) APPARATUS AND METHOD FOR ADAPTIVE THREE DIMENSIONAL TELEVISION Y/C SEPARATION COMB FILTER BANK

(75) Inventor: Jooho Lee, Campbell, CA (US)

(73) Assignee: NDSP Corporation, Campbell, CA (US)

( * ) Notice: Subject to any disclaimer, the term of this patent is extended or adjusted under 35 U.S.C. 154(b) by 504 days.

(21) Appl. No.: 09/896,013

(22) Filed: Jun. 28, 2001

(51) Int. Cl.[7] .............................. H04N 9/77; H04N 9/78
(52) U.S. Cl. ........................ 348/665; 348/666; 348/669
(58) Field of Search ................................ 348/663–670, 348/708, 712, 713; H04N 9/77, 9/78

(56) References Cited

U.S. PATENT DOCUMENTS

| | | | | |
|---|---|---|---|---|
| 4,641,180 A | * | 2/1987 | Richter | 348/669 |
| 5,045,929 A | * | 9/1991 | Rabii | 348/669 |
| 5,339,113 A | * | 8/1994 | Iwasaki | 348/604 |
| 5,373,329 A | * | 12/1994 | Niitsu | 348/669 |
| 5,473,389 A | * | 12/1995 | Eto et al. | 348/669 |

* cited by examiner

Primary Examiner—Micahel H. Lee
(74) Attorney, Agent, or Firm—Marger Johnson & McCollom, P.C.

(57) ABSTRACT

An apparatus and method for a three-dimensional luminance/chrominance (Y/C) seperation comb filter bank. The method and system consider the effect of motions in the temporal domain as the effect of edges in the spatial domain. The method and system apply a temporal filter to the section rule of edge location detection in the spatial domain. With this applications, the three-dimension comb filter bank can separate Y and C from each other freely without motion consideration. The method and system do not simply exploit the topology in the pixel phases. Rather, the method and system consider the Y/C comb filter to operate from the spectral viewpoint. Temporal filtering function is increased to better utilize the memory buffers of the three-dimensional filter. In so doing, balanced usage among the horizontal, vertical and temporal filter functions is achieved using the method and system.

15 Claims, 8 Drawing Sheets

Current Field

APPARATUS AND METHOD FOR ADAPTIVE THREE DIMENSIONAL TELEVISION Y/C SEPARATION COMB FILTER BANK

FIELD OF THE INVENTION

The invention relates to separation of luminance (Y) and chrominance (C) in a TV composite signal, particularly to Y/C separation for a TV composite signal using a comb filter bank.

BACKGROUND

A typical color TV decoder receives a composite TV signal as input. Using a comb filter, the color decoder separates Luminance (Y) and Chrominance (C) from the input signal. Next, the comb filter applies the band-pass filtering for the C signal and the band-stop filtering for the Y signal. Thirdly, the C signal is de-modulated back to the base-band region. Fourthly, a low-pass filter band-limits both the de-modulated C signal and the Y signal. Lastly, the band-limited Y and C signals are converted to Red, Green, and Blue outputs.

The composite signal allocates Y and C in the three-dimensional spectral positions in a three-dimensional spectral space. When represented in a one-dimensional or a two-dimensional subspace of the three-dimensional spectral space, the spectrum of Y and C overlap with each other. As such, one-dimensional and two-dimensional comb filters cannot separate Y and C completely. Rather, only three-dimensional comb filters can separate Y and C from a digitized composite image sequence completely. Moreover, as a genuine nonlinear characteristic of an image, edges inside image make difficult any Y/C comb filtering for completely separating Y from C or C from Y in a composite TV signal. Even worse, in an image sequence or video, motions inside image exist in a speed to any directions. Therefore, without perfect motion estimation for the motion of edges in addition to the motion of an ordinary object, the complete Y/C separation cannot be achieved by a one-dimensional or two-dimensional linear comb filter.

However, few real three-dimensional Y/C comb filters are available for a digital color decoder. Even a conventional three-dimensional comb filter operates mostly for the condition of motionless image sequences. It does not fully take advantage of the strong points of three-dimensional comb filters.

For example, most of video signal includes lots of motion contents, but a conventional three-dimensional comb filter function merely two-dimensional comb filter in the spatial domain. Specifically, conventional three-dimensional comb filters simply apply to the conditions of motionless parts in video by a go-no-go decision, wherein the temporal filter function of these three-dimensional filters is not selected in most case. Therefore, a conventional three-dimensional comb filter typically operates merely as a two-dimensional comb filter. For that reason, the conventional three-dimensional comb filter is ineffective when filtering complex motion video content. As another example, memory buffers are necessary to store data for performing the temporal filtering of a conventional three-dimensional filter. However, by operating merely as a two-dimensional comb filter most of the time, the conventional three-dimensional filter rarely use these precious memory buffers.

BRIEF SUMMARY OF THE INVENTION

A method for separating luminance (Y) and chrominance (C) of a composite television digital signal is provided. The method includes analyzing said composite signal to search for one of a plurality of pre-defined motions; in response to a pre-defined motion being detected, filtering the spectral energy of said detected pre-defined motion by a one-dimensional temporal comb filter selected from a filer bank; in response to no pre-defined motion being detected, analyzing said signal by searching for an edge in a three-dimensional sample space of said signal, wherein said sample space is spanned by a horizontal axis, a vertical axis and a temporal axis, and wherein said edge represents a motion encoded in said signal; in response to said edge being detected, selecting a filter of said filter bank in accordance with the orientation of said edge to filter the spectral energy of said motion; and in response to no edge being detected, selecting a three-dimensional spatial-temporal comb filter of said filter bank.

A method for separating luminance (Y) and chrominance (C) of a composite TV digital signal is provided. The method includes searching for motion encoded in said signal, wherein a motion is represented as an edge in a three-dimensional sample space of said signal, said sample space spanned by a horizontal axis, a vertical axis and a temporal axis; in response to detecting a first motion that matches one of a plurality of pre-defined motions, select a one-dimensional temporal filter of a filter bank to filter spectral energy corresponding to a first edge that represents said first motion in said sample space; and in response to detecting a second motion that is different from any of said n pre-defined motions, selecting a filter of said filter bank to filter spectral energy corresponding to a second edge, said filter selected according to the orientation of said second edge in said sample space.

A method for separating luminance (Y) and chrominance (C) from a composite TV digital signal is provided. The method includes searching for a plurality of pre-defined motion cases, said plurality of pre-defined motion cases comprises the motionless case; in response to finding at least one of said pre-defined motion cases, performing Y/C separation of said composite TV digital signal by selecting a one-dimensional (1D) temporal comb filter from a filter bank, said filter bank comprises a plurality of 1D temporal comb filters in one-to-one correspondence with said plurality of pre-defined motion cases; in response to finding none of said pre-defined uniform motion cases, performing Y/C separation of said composite TV digital signal by selecting according to a selection method a filter from the portion of said filter bank that comprises a 1D horizontal (H) comb filter, a 1D vertical (V) comb filter, a two-dimensional (2D) horizontal-vertical (HV) comb filter, a 2D horizontal-temporal (HT) comb filter, a 2D vertical-temporal (VT) comb filter, a 3D horizontal-vertical-temporal (HVT) comb filter.

A filter bank for a TV composite signal is provided. The filter bank includes an one-dimensional (1D) temporal comb filter adapted to perform Y/C separation for a motionless image; a plurality of 1D temporal comb filters adapted to perform Y/C separation by limiting spectral energy associated with an image motion detected having a pre-defined uniform velocity; and a plurality of two-dimensional (2D) comb filters. The 2D comb filters include a 2D spatial (HV) comb filter adapted to limit spectral energy along horizontal and vertical frequency axes of a 3D spectral space of said signal; a 2D spatial-temporal (HT) comb filter adapted to limit spectral energy along horizontal and temporal frequency axes of said 3D spectral space, and a 2D spatial-temporal (VT) comb filter adapted to limit spectral energy along vertical and temporal frequency axes of said 3D spectral space. The filter bank includes a three-dimensional (3D) spatial-temporal (HVT) comb filter adapted to limit spectral energy along horizontal, vertical and temporal frequency axes of said 3D spectral space.

A color TV decoder for a TV composite signal is provided. The color decoder includes a motion detection unit adapted to detect any of a plurality of pre-defined velocities from a set of gray level differences; and a filter bank coupled to said motion detection unit. The filter bank includes a one dimensional (1D) temporal comb filter adapted to filter a motionless image detected by said motion detection unit; a first plurality of 1D temporal comb filters adapted to filter an image motion detected by said motion detection unit as having a velocity that is equal to one of the said plurality of pre-defined velocities; a second plurality of 1D comb filters adapted to limit spectral energy along one of the three frequency axes of spectral space; a third plurality of two-dimensional (2D) comb filters adapted to filter an image by limiting spectral energy along two of said three frequency axes; and a three-dimensional (3D) comb filter adapted to filter an image by limiting spectral energy along all of said three frequency axes.

A filter bank for filtering a TV composite signal is provided. The filter bank includes a two-dimensional (2D) spatial horizontal-vertical (HV) comb filter adapted to be activated to filter spectral energy associated with a first edge in a two-dimensional sample space spanned by a horizontal axis and a vertical axis; a 2D spatial-temporal (T) comb filter adapted to be activated to filter spectral energy associated with a horizontal motion, wherein said horizontal motion is represented as a second edge in a two-dimensional sample space spanned by said horizontal axis and a temporal axis; and a 2D spatial-temporal (VT) comb filter adapted to be activated to filter spectral energy associated with a vertical motion, wherein said vertical motion is represented as a third edge in a two-dimensional sample space spanned by said vertical axis and said temporal axis; and a three-dimensional (3D) spatial-temporal (HVT) comb filter adapted to be activated to filter spectral energy associated with a motion that cannot be properly filtered with said above filters.

A filter bank for filtering a TV composite signal is provided. The filter bank includes a first filter set comprising k one-dimensional (1D) temporal comb filters, wherein a filter from said first filter set is adapted to be selected to filter said signal in a first stage of processing said signal, wherein said k>1; a second filter set comprising a 1D horizontal (H) comb filter and a 1D vertical (V) comb filter, wherein a filter from said second filter set is adapted to be selected to filter said signal in a second stage of processing said signal if no filter is selected in said first stage; a third filter set comprising a two-dimensional (2D) horizontal-vertical (HV) comb filter, a 2D horizontal-temporal (HT) comb filter and a 2D vertical-temporal (VT) filter, wherein a filter from said third filter set is adapted to be selected to filter said signal in a third stage of processing said signal if no filter is selected in said second stage; and a fourth filter set comprising a three-dimensional (3D) horizontal-vertical-temporal (HVT) comb filter, wherein said 3D (HVT) comb filter is selected to filter said signal in a fourth stage of processing said signal if no filter is selected in said third stage, and wherein the orientation of an edge in a three-dimensional sample space of said signal is used for filter selection.

BRIEF DESCRIPTION OF THE FIGURES

The accompanying drawings which are incorporated in and form a part of this specification, illustrate embodiments of the invention and together with the description, serve to explain the principles of the invention:

FIG. 3A shows a pre-defined neighborhood centered around a processing pixel of a current processing field in accordance with one embodiment of the invention.

FIG. 3B shows a sequence of fields having a current processing field and its previous and next fields in accordance with one embodiment of the invention.

FIG. 3C shows pixel labels in a current processing field and its previous and next fields in accordance with one embodiment of the invention.

FIG. 3D shows thirteen motions that are pre-defined with reference to a current processing field and its previous and next fields in accordance with one embodiment of the invention.

DETAILED DESCRIPTION

Reference is made in detail to the preferred embodiments of the invention. While the invention is described in conjunction with the preferred embodiments, the invention is not intended to be limited by these preferred embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. However, as is obvious to one ordinarily skilled in the art, the invention may be practiced without these specific details. In other instances, well-known methods, procedures, components, and circuits have not been described in detail so that aspects of the invention will not be obscured.

Figure 1:
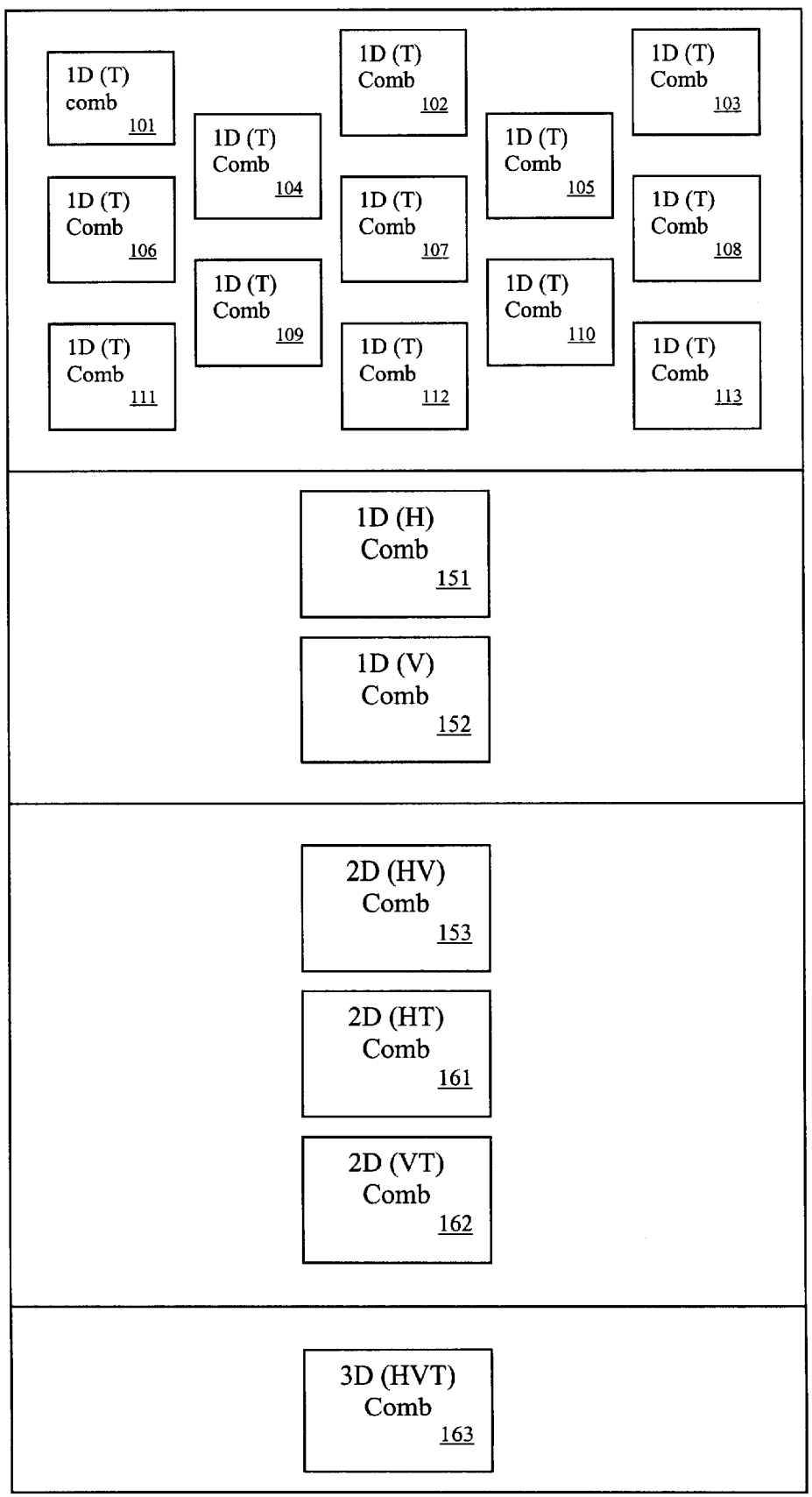
FIG. 1 depicts the content of a three-dimensional comb filter bank in accordance with one embodiment of the invention.

Referring now to FIG. 1, the content of a three-dimensional comb filter bank 100 is depicted in accordance with one embodiment of the invention. The filter bank 100 comprises these constituent filters:

a one-dimensional horizontal comb filter 151;
a one-dimensional vertical comb filter 152;
a two-dimensional spatial comb filter 153;
a two-dimensional horizontal-temporal comb filter 161;
a two-dimensional vertical-temporal comb filter 162;
a three-dimensional spatial-temporal comb filter 163; and
thirteen one-dimensional temporal comb filters 101–113.

Filter bank 100 is adaptive to the detection of edge locations and motion speeds. The band limitation of the filters (101–113, 151–153 and 161–163) in filter bank 100 is based on a three-dimensional spectral space that is spanned by a horizontal frequency axis, a vertical frequency axis, and a temporal frequency axis (also known respectively as a line frequency axis, a pixel frequency axis and a field frequency axis). The spectrum energy of a TV composite signal is represented using this three-dimensional spectral space. Y/C separation is performed by filtering the spectrum energy with a filter selected from filter bank 100. The TV composite signal itself is sampled within a three-dimensional sample space spanned by a horizontal axis, a vertical axis and a temporal axis. The sample space is the dual space of the spectral space.

For the spatial filters, filter bank 100 comprises two one-dimensional comb filters 151–152 and one two-dimensional spatial comb filter 153. Specifically, filter 151 is adapted to filter spectrum energy of a TV composite signal along the horizontal frequency axis. Filter 152 is adapted to filter spectrum energy of a TV composite signal along the vertical frequency axis. Filter 153 is adapted to filter spectrum energy of a TV composite signal in the plane spanned by the horizontal and vertical frequency axes.

In the present embodiment, each of filters 151–152 is a 3-tab filter having filter coefficients specified as: $[-1, 0, 2, 0, -1]/4$. Filter 153 is a two-dimensional filter having coefficients specified as:

$$\begin{bmatrix} 0 & 0 & -1/8 & 0 & 0 \\ -1/8 & 0 & 4/8 & 0 & -1/8 \\ 0 & 0 & -1/8 & 0 & 0 \end{bmatrix}.$$

However, as understood herein, each of filters 151–152 need not be implemented with the coefficients specified above. For example, in another embodiment, each of filters 151–152 is implemented as a n-tab filter wherein n is greater than 3. Also, filter 153 need not be implemented with the specified coefficients. For example, in yet another embodiment, rather than the 3×5 matrix of filter coefficients shown above, a j×k matrix is used to specify the filter coefficients of filter 153, wherein j>3 and k>5.

For the spatial-temporal filters, filter bank 100 comprises two two-dimensional comb filters 161–162 and one three-dimensional spatial-temporal comb filter 163. Specifically, filter 161 is adapted to filter spectrum energy of a TV composite signal in the plane spanned by the horizontal and temporal frequency axes. Filter 162 is adapted to filter spectrum energy of a TV composite signal in the plane spanned by the vertical and temporal frequency axes. Filter 163 is adapted to filter spectrum energy of a TV composite signal along all three frequency axes (horizontal, vertical and temporal frequency axes).

In the present embodiment, each of filters 161–162 is a two-dimensional filter having coefficients specified as:

$$\begin{bmatrix} 0 & 0 & -1/8 & 0 & 0 \\ -1/8 & 0 & 4/8 & 0 & -1/8 \\ 0 & 0 & -1/8 & 0 & 0 \end{bmatrix}.$$

However, filters 161–162 need not be implemented as such. For example, in yet another embodiment, rather than the 3×5 matrix of filter coefficients shown above, a j×k matrix is used to specify the filter coefficients of filter 153, wherein j>3 and k>5.

Also, in the present embodiment, filter 163 is a three-dimensional filter having coefficients specified as:

$$\begin{bmatrix} 0 & 0 & 0 & 0 & 0 \\ 0 & 0 & -1/12 & 0 & 0 \\ 0 & 0 & 0 & 0 & 0 \end{bmatrix} \text{ at time} = -2;$$

$$\begin{bmatrix} 0 & 0 & 0 & 0 & 0 \\ 0 & 0 & 0 & 0 & 0 \\ 0 & 0 & 0 & 0 & 0 \end{bmatrix} \text{ at time} = -1;$$

$$\begin{bmatrix} 0 & 0 & -1/12 & 0 & 0 \\ -1/12 & 0 & 6/12 & 0 & -1/12 \\ 0 & 0 & -1/12 & 0 & 0 \end{bmatrix} \text{ at time} = 0;$$

$$\begin{bmatrix} 0 & 0 & 0 & 0 & 0 \\ 0 & 0 & 0 & 0 & 0 \\ 0 & 0 & 0 & 0 & 0 \end{bmatrix} \text{ at time} = 1; \text{ and}$$

$$\begin{bmatrix} 0 & 0 & 0 & 0 & 0 \\ 0 & 0 & -1/12 & 0 & 0 \\ 0 & 0 & 0 & 0 & 0 \end{bmatrix} \text{ at time} = 2.$$

However, as understood herein, filter 163 need not be implemented with the filter coefficients shown with the five 3×5 matrices above. For example, in another embodiment of the invention, a filter is implemented having its filter coefficients specified with h j×k matrices, wherein h>5, j>3 and k>5.

For the temporal filters, filter bank 100 comprises thirteen filters that are one-dimensional temporal comb filters 101–113. Each of filters 101–113 is adapted to filter a TV composite signal whose image is moving along one of 13 pre-defined directions with respect to a processing pixel. The details to these pre-defined directions will be described with reference to FIGS. 3A–D.

In the present embodiment, a one-dimensional comb filer is implemented with a 2-tab filter whose filter coefficients are specified as $[1, -1]/2$. However, as understood herein, a one-dimensional comb filter need not be restricted to a filter having these coefficients. For example, in an alternative embodiment, a one-dimensional comb filter having different filter coefficients is implemented.

In contrast to a single temporal filter of a conventional three-dimensional comb filter, multiple temporal filters (thirteen temporal filters 101–113) are implemented for the temporal filter function in filter bank 100 in the present embodiment. As such, the effectiveness of filter bank 100 as a three-dimensional comb filter is increased. Specifically, filter bank 100 operates according to a selection method for selecting a filter from filter bank 100. In so doing, the usage among the horizontal, vertical, and temporal filter functions is more balanced when compared to the conventional three-dimensional comb filter.

Moreover, in contrast to a conventional three-dimensional comb filter, Y/C comb filters of filter bank 100 do not simply exploit the topology in the pixel phases. Rather, these Y/C comb filters of filter bank 100 also works from a spectral viewpoint. Specifically, from a statistical viewpoint, the sudden gray-level changes in the edges have the same prediction effect of the sudden gray-level changes by the motions. As such, the effect of motions in the temporal domain can be considered to have the same effect of edges in the spatial domain. More specifically, when represented in the three-dimensional sample space, a motion encoded in a composite signal appears as an edge in the three-dimensional sample space. Therefore, filter bank 100 applies a temporal comb filter to the process of detecting edge location in the spatial domain. With this application from the spectral viewpoint, three-dimensional comb filter bank 100 can separate Y and C from each other freely without motion consideration.

Referring still to FIG. 1, in processing a motionless object case, the filter 151, 152, and 153 will be selected by the edge locations in the sample space. On the other hand, in processing a motion object case, the filter 161, 162, 163, and 101–113 will be selected by the motion speeds by a selection method to be outlined with FIG. 2.

The filter selection method uses priority levels and threshold values to make a go-no-go decision. The priority levels are:

highest priority level filters: filters 101–113;

high priority level filters: filter 151, filter 152;

low priority level filters: filter 161, filter 162, filter 153; and lowest priority level filters: filter 163.

In addition, the priority levels can be associated with four processing stages of the selection method. Filters 101–113 are associated with the first stage; filters 151–152 are associated with the second stage; filters 153 and 161–162 are associated with the third stage; and filter 163 is associated with the fourth stage.

Specifically, in the first processing stage, the selection method checks if one of filters 101–113 can be selected to perform Y/C separation for an image to be filtered. The selection method enters the second processing stage if none of filters 101–113 is selected to perform Y/C separation for the image. In the second processing stage, the selection method checks if one of filters 151–152 can be selected to perform Y/C separation for the image. The selection method enters the third processing stage if none of filters 151–152 is selected to perform Y/C separation for the image. In the third processing stage, the selection method checks if one of filters 161–162 and 153 can be selected to perform Y/C separation for the image. The selection method enters the fourth stage if none of filters 161–162 and 153 is selected to perform Y/C separation for the image.

Figure 2:
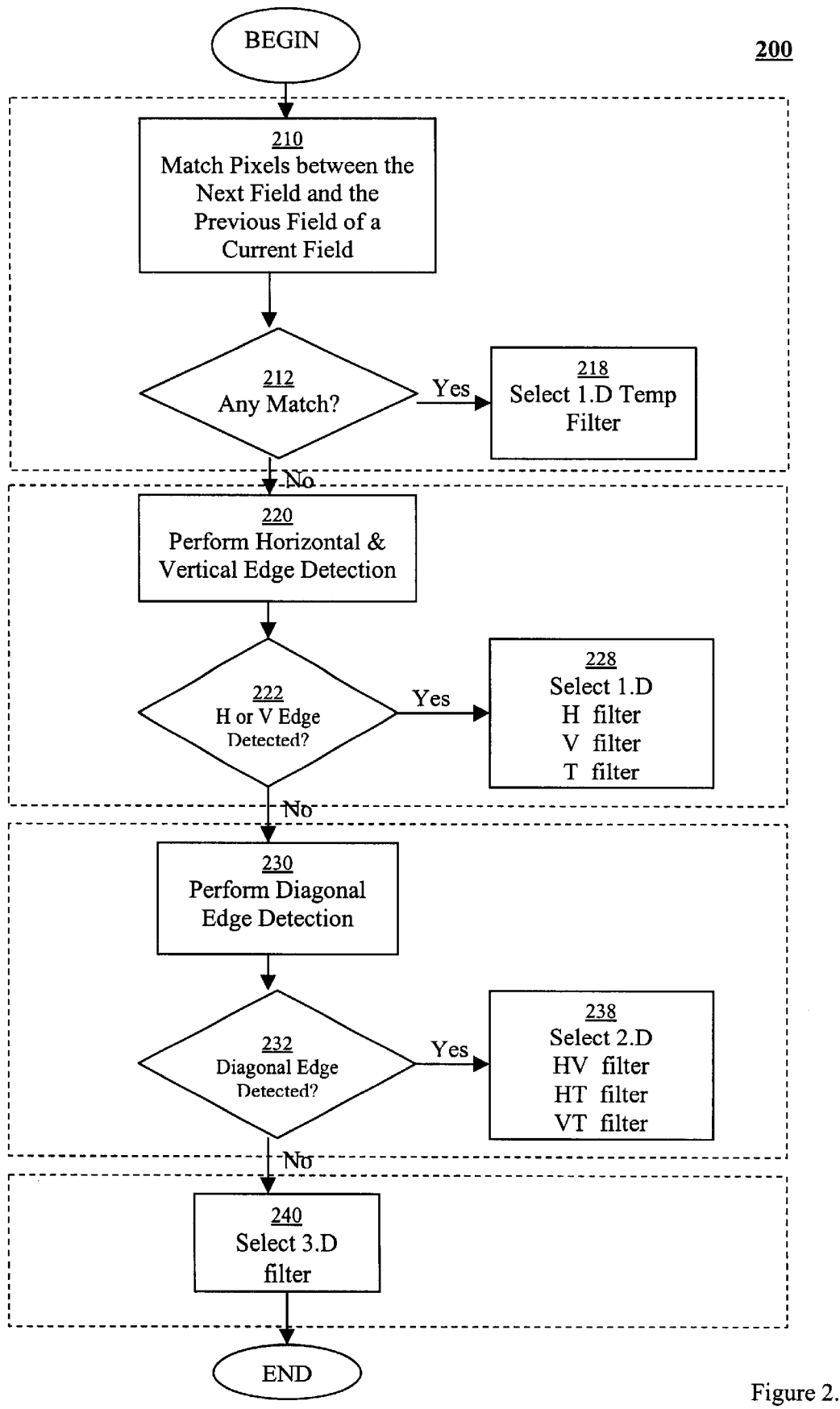
FIG. 2 is a flow chart that outlines steps of a method for selecting a filter from a filter bank in accordance with one embodiment of the invention.
Figure 4:
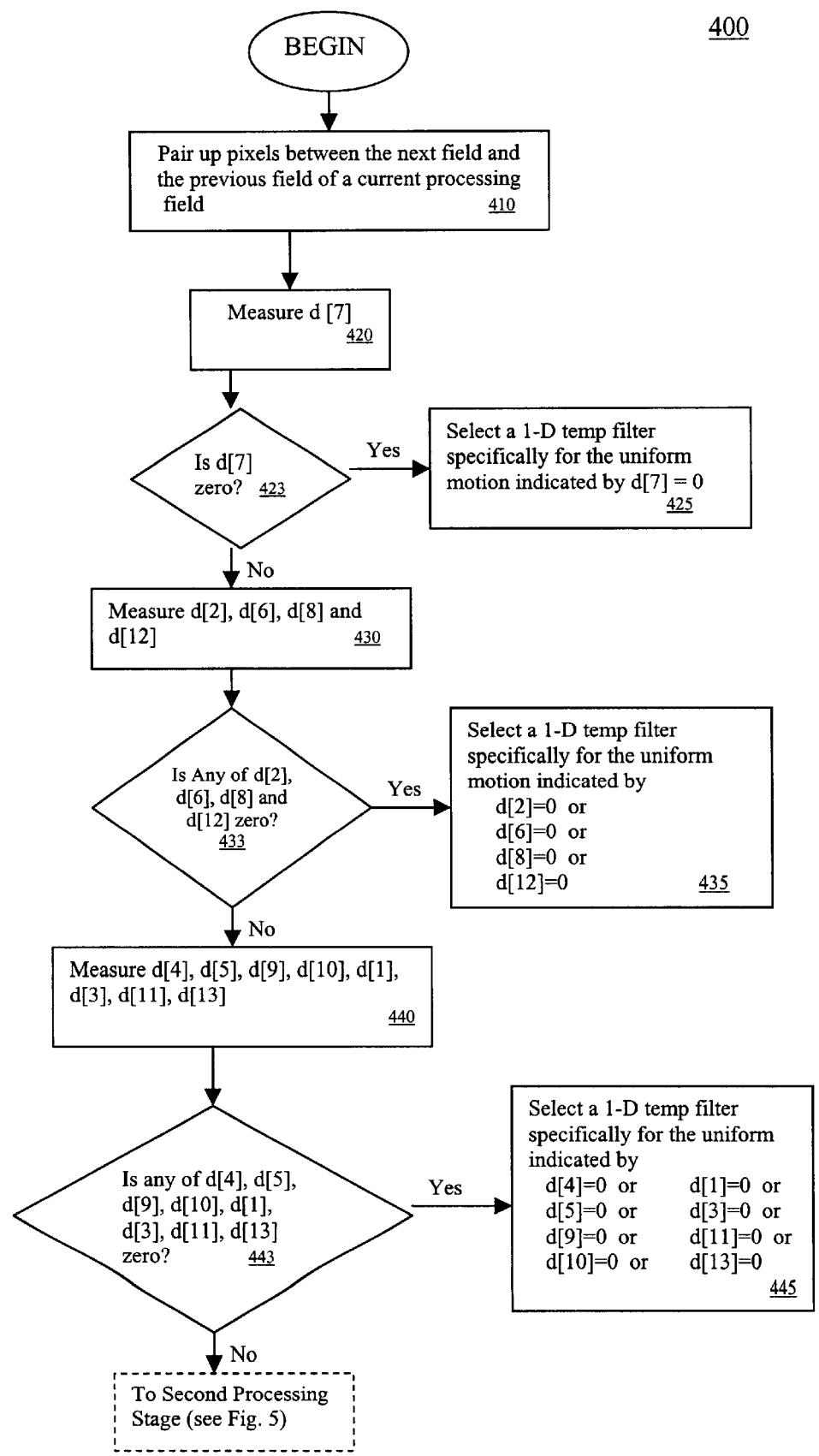
FIG. 4 is a flow chart that outlines steps of a method for selecting a one-dimensional temporal filter from a filter bank in accordance with one embodiment of the invention.
Figure 5:
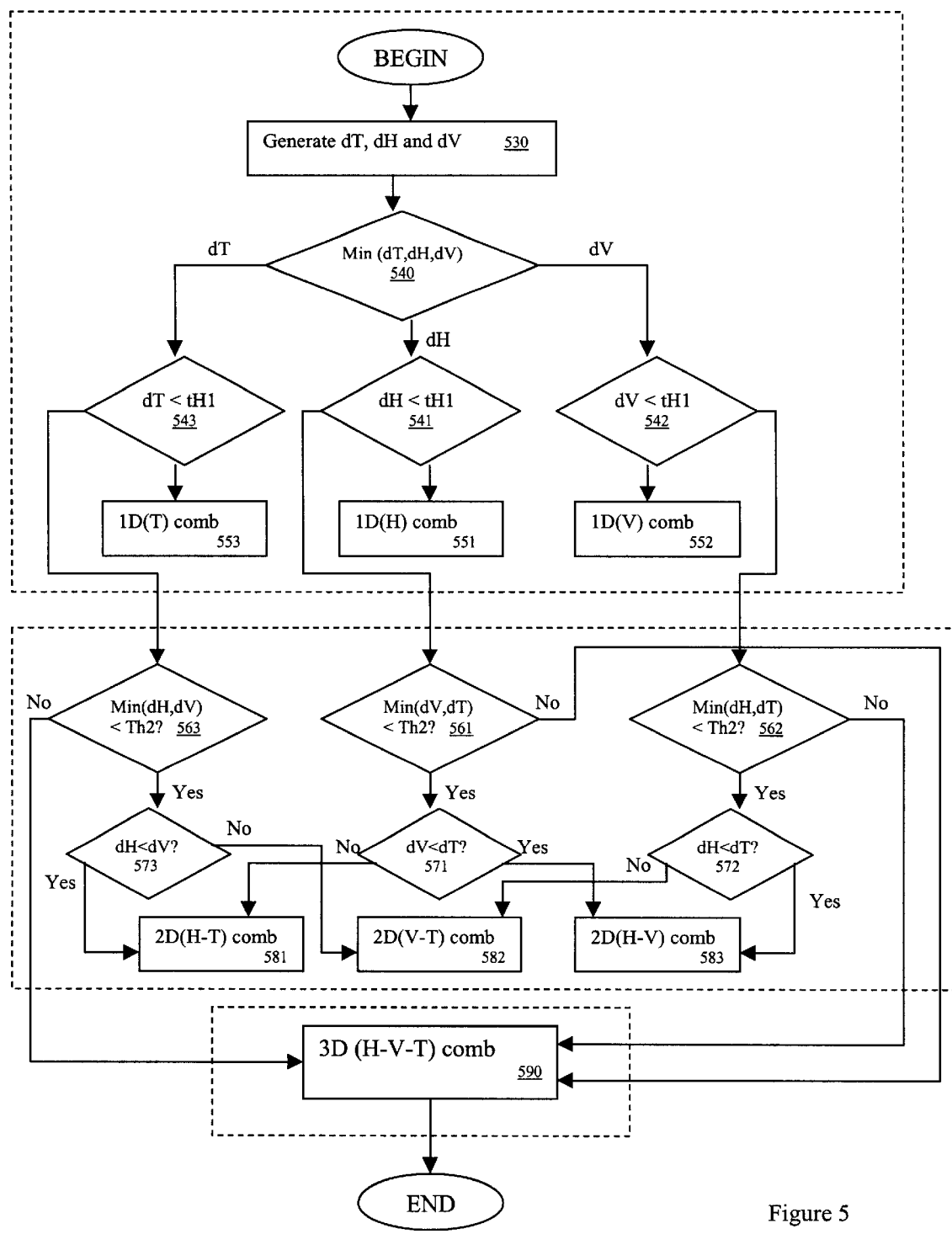
FIG. 5 is a flow chart that outlines steps of a method for selecting a filter from a filter bank according to the orientation of an edge in a sample space in accordance with one embodiment of the invention.

In view of FIG. 1, FIGS. 2, 4 and 5 introduce various stages of implementing the selection method for selecting a filter from filter bank 100 in accordance with one embodiment of the invention. FIG. 2 outlines the steps of the selection method. Then, FIGS. 4–5 provide the details of the outlined steps. Specifically, FIG. 2 shows the relationship among the various stages of the selection method. FIG. 4 shows the first stage of the selection method. FIG. 5 shows the second, third and fourth stages of the selection method.

Referring now to FIG. 2, a flow chart 200 is shown outlining steps of a method for selecting a filter from filter bank 100 in accordance with one embodiment of the invention. The selected filter is then used to separate the Y signal and the C signal from a TV composite signal.

The first processing stage of the selection method comprises steps 210, 212 and 218.

In step 210, the filter selection method starts by matching pixels between the next field of a current processing field and the previous field of the current processing field. The matching operation involves two pre-defined pixel neighborhoods of the same size. Specifically, a first pre-defined pixel neighborhood of the next field is compared to a second pre-defined pixel neighborhood of the previous field. A pixel in the first neighborhood has a corresponding pixel in the second neighborhood. Gray level of a pixel in the first pixel neighborhood is compared to gray level of the corresponding pixel in the second pixel neighborhood. (Further details of the matching operation will be described in relation to FIG. 4.)

In query step 212, the result of the matching operation is used to decide the next operating step. If at least one gray level match exists, then step 218 is performed. If no matched gray levels exist, then step 220 is performed.

In step 218, a one-dimensional temporal comb filter from filter bank 100 is selected to perform Y/C separation. Specifically, the temporal comb filter is selected from among temporal filters 101–113. The selected temporal filter is specifically adapted to filter a uniform velocity motion as indicated by the matched gray levels.

The second processing stage of the selection method comprises steps 220, 222 and 228. If an edge in the sample space is detected along the horizontal, the vertical, or the temporal axes, then a filter is selected according to the orientation of the edge.

In step 220, in the current processing field, operation is performed for detecting edge locations in the spatial domain (the sample space) horizontally or vertically with the four adjacent pixel samples. (Further details of the detecting operation will be described in relation to FIG. 5.)

In query step 222, a check is performed to see if such horizontal or vertical edge location is detected in the sample space. If such horizontal or vertical edge location is detected, then step 228 is performed. Otherwise, if no such horizontal or vertical edge location is detected, then step 230 is performed.

In step 228, a one-dimensional comb filter is selected from filter bank 100 to perform Y/C separation. Specifically, the one-dimensional horizontal comb filter 161 is selected if the detected edge horizontal. The one-dimensional vertical comb filter 162 is selected if the detected edge is vertical. A one-dimensional temporal comb filter is selected if motion is detected is along the temporal axis of the sample space.

The third stage of the selection method comprises steps 230, 232 and 238. If an edge in the sample space is detected along a direction diagonal to the horizontal, the vertical or the temporal axes, then a filter is selected according to the orientation of the edge.

In step 230, operation is performed for detecting diagonal edges. (Further details of the diagonal edge detection will be described in relation to FIG. 5.)

In query step 232, a check is performed to see if any diagonal edge is detected. If such diagonal edge is detected, then step 238 is performed. If no such diagonal edge is detected, then step 240 is performed.

In step 238, a two-dimensional comb filter is selected from filter bank 100 to perform Y/C separation. Specifically, the spectral energy is bounded by the three two-dimensional filters. As such, a horizontal-vertical comb filter, a horizontal-temporal comb filter, or a vertical-temporal comb filter is selected.

The fourth stage of the selection method comprises step 240.

In step 240, three-dimensional comb filter 163 is selected from filter bank 100 to perform Y/C separation. Specifically, three-dimensional spatial-temporal comb filter 163 is selected because it can limit the spectral energy in any directions. On the other hand, none of the other filters work well due to edges in fast motion, By using the above filter selection method outlined, the present embodiment increases the effectiveness of three-dimensional comb filters and achieves a balanced usage among the horizontal, vertical, and temporal filter functions.

Referring now to FIGS. 3A–D, three 5 by 5 pixel neighborhoods (371–373) are shown respectively in three consecutive fields (391–393) from a TV composite signal in accordance with one embodiment of the invention. These pixel neighborhoods (371–373) will be used to support the following discussion regarding the details of the first processing stage of the selection method.

Figure 3A:
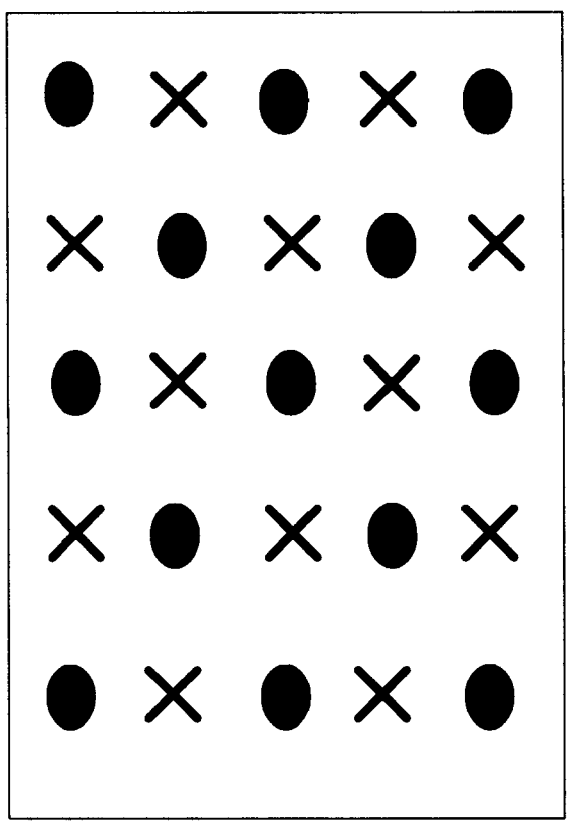
FIGS. 3A–D show a current processing field and its previous and next fields in accordance with one embodiment of the invention.

Referring now to FIG. 3A, a neighborhood 372 centered about a processing pixel 399 in a current processing field 392 is shown in accordance with one embodiment of the invention. Neighborhood 372 is pre-defined to be a window of 5 pixels by 5 pixels wherein 13 pixels out of the 25 pixels in neighborhood 372 are of the same phase. To indicate these 13 pixels as having the same phase, these 13 pixels are depicted as dark dots.

Figure 3B:
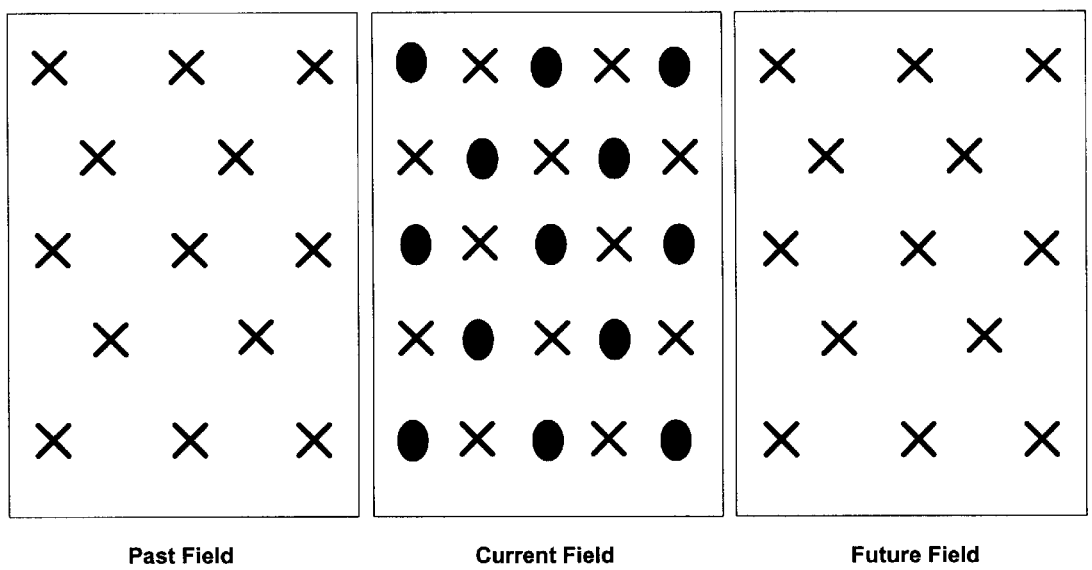

Referring now to FIG. 3B, a sequence of fields is shown having current processing field 392 together with its previous (past) field 391 and next (future) field 393. As shown, each of fields 391–393 has a pre-defined neighborhood entered about a pixel. Pre-defined neighborhood 371 in field 391 is of the same size (5 pixels by 5 pixels) as neighborhood 372. Also, pre-defined neighborhood 371 is centered about a pixel 391 having the same coordinates as processing pixel 392. Similarly, pre-defined neighborhood 373 in field 393 is of the same size as neighborhood 372. Also, pre-defined neighborhood 373 is centered about a pixel 393 having the same coordinates as processing pixel 392.

Figure 3C:
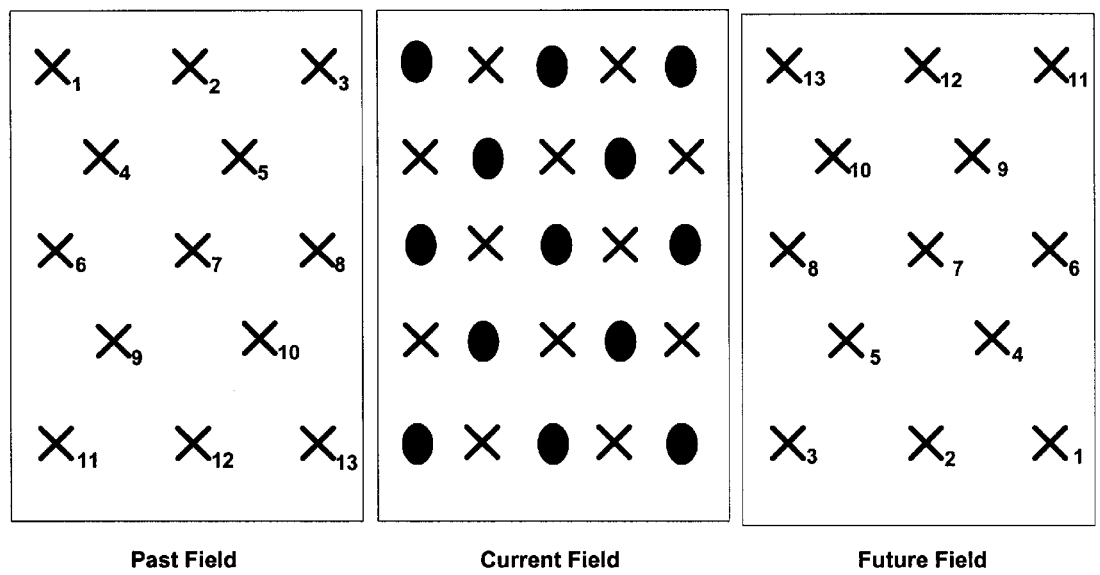

Referring now to FIG. 3C, labeling schemes of pre-defined neighborhoods 371 and 373 are shown in accordance with one embodiment of the invention. The labeling scheme of pre-defined neighborhood 371 starts with x[1] from the upper-left corner and ends with x[13] at the lower-right corner of pre-defined neighborhood 371. On the other hand, the labeling scheme of pre-defined neighborhood 373 starts from x[1] at the lower-right corner and ends with x[13] at the upper-left corner of the pre-defined neighborhood 373.

Figure 3D:
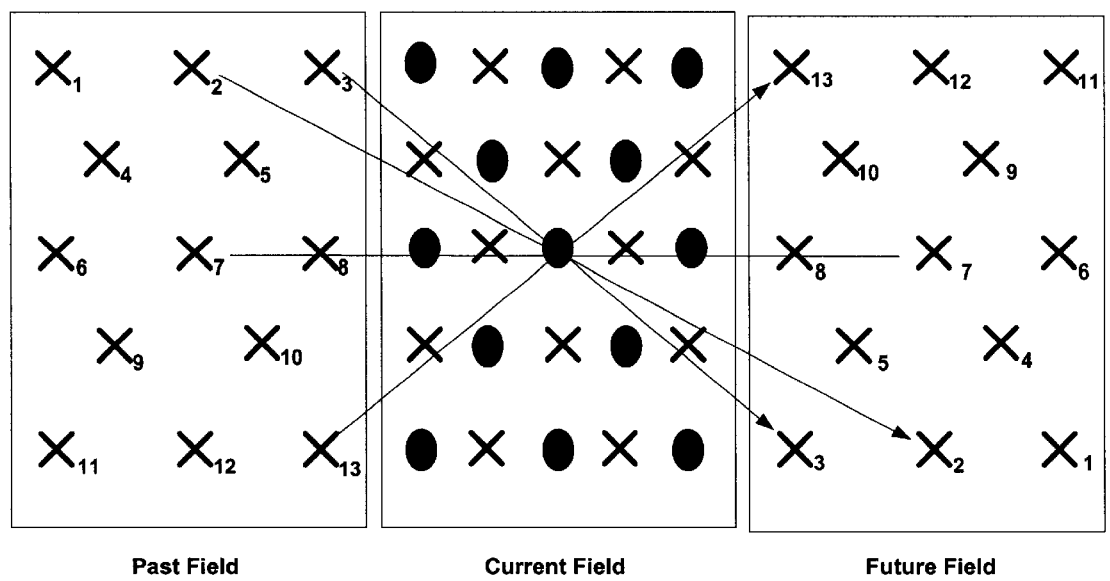

Referring now to FIG. 3D, several of 13 uniform motions 301–313 are depicted in accordance with one embodiment of the invention. Specifically, in order not to obscure the entire FIG. 3D, only uniform motions 302, 303, 307 and 313 are depicted in FIG. 3D. As shown, uniform motion 302 refers to a motion traveling from pixel position x[2] in previous field 391 to pixel position x[2] in next field 393. Similarly, for any n from {301–313}, uniform motion n refers to a motion traveling from pixel position x[n−300] in previous field 391 to pixel position x[n−300] in next field 393. For example, uniform motion 309 refers to a motion traveling from pixel position x[9] in previous field 391 to pixel position x[9] in next field 393.

Uniform motions 301, 303, 311 and 313 have the same speed in the four directions shown. Uniform motions 301 and 313 have opposite velocities. Uniform motions 303 and 311 have opposite velocities. Specifically, uniform motion 301 refers to the motion of going from pixel x[1] of neighborhood 371 to pixel x[1] of neighborhood 373. Uniform motion 303 refers to the motion of going from pixel x[3] of neighborhood 371 to pixel x[3] of neighborhood 373. Uniform motion 311 refers to the motion of going from pixel x[11] of neighborhood 371 to pixel x[11] of neighborhood 373. Uniform motion 313 refers to the motion of going from pixel x[13] of neighborhood 371 to pixel x[13] of neighborhood 373.

Uniform motions 302, 306, 308 and 312 have the same speed in the four directions shown. Uniform motions 302 and 312 have opposite velocities. Uniform motions 306 and 308 have opposite velocities. Specifically, uniform motion 302 refers to the motion of going from pixel x[2] of neighborhood 371 to pixel x[2] of neighborhood 373. Uniform motion 306 refers to the motion of going from pixel x[6] of neighborhood 371 to pixel x[6] of neighborhood 373. Uniform motion 308 refers to the motion of going from pixel x[8] of neighborhood 371 to pixel x[8] of neighborhood 373. Uniform motion 312 refers to the motion of going from pixel x[12] of neighborhood 371 to pixel x[12] of neighborhood 373.

Uniform motions 304, 305, 309 and 310 have the same speed in the four directions shown. Uniform motions 304 and 310 have opposite velocities. Uniform motions 305 and 309 have opposite velocities. Specifically, uniform motion 304 refers to the motion of going from pixel x[4] of neighborhood 371 to pixel x[4] of neighborhood 373. Uniform motion 305 refers to the motion of going from pixel x[5] of neighborhood 371 to pixel x[5] of neighborhood 373. Uniform motion 309 refers to the motion of going from pixel x[09] of neighborhood 371 to pixel x[09] of neighborhood 373. Uniform motion 310 refers to the motion of going from pixel x[10] of neighborhood 371 to pixel x[10] of neighborhood 373.

Uniform motion 307 has zero speed. As such it is also considered as a uniform motion.

Referring now to FIG. 4 in view of FIGS. 3A–D, a flow chart 400 is shown providing the details of the first processing stage of the selection method (steps 210, 212 and 218 in flow chart 200 shown in FIG. 2) in accordance with one embodiment of the invention. Specifically, flow chart 400 is shown outlining steps for matching pixels between previous field 391 and next field 393.

In step 410, pixels between next field 393 and previous field 391 are matched and paired up. The matching operation involves two pre-defined pixel neighborhoods (371 and 373) of the same size. Specifically, pre-defined pixel neighborhood 371 is compared to pre-defined pixel neighborhood 373. For example, a pixel labeled x[1] in neighborhood 371 is paired with a pixel that is labeled x[1] in neighborhood 373. Gray level of pixel x[1] in pixel neighborhood 371 is compared to gray level of the corresponding x[1] pixel in pixel neighborhood 373. Similarly, a pixel labeled x[2] in neighborhood 371 is paired with a pixel that is labeled x[2] in neighborhood 373. Gray level of pixel x[2] in neighborhood 371 is compared to gray level of the corresponding x[2] label in neighborhood 373. Similar label matching is also performed for pixels that are labeled x[3] to x[13].

In step 420, measurement is performed to obtain d[7], which is the gray level difference between pixel x[7] of neighborhood 371 and pixel x[7] of neighborhood 373. If d[7] is zero, then uniform motion 301 is indicated.

In query step 423, a check is made to see if d[7] is zero. If d[7] is zero, then step 425 is performed. Otherwise, step 430 is performed.

In step 425, one-dimensional temporal comb filter 107 is selected from filter bank 100 to perform Y/C separation. Specifically, if d[7] is zero, then the uniform motion of zero velocity is indicated. As such, filter 107 is selected because it is specifically adapted to filter this zero velocity uniform motion (uniform motion 307 shown in FIG. 3D).

In step 430, measurements are performed to obtain d[2], d[6], d[8] and d[12], which are gray level differences. As shown, the gray level measurements are limited to the horizontal and the vertical directions of pixel x[7]. Specifically, d[2] is the gray level difference between pixel x[2] of neighborhood 371 and pixel x[2] of neighborhood 373. If d[2] is zero, then uniform motion 302 is indicated. d[6] is the gray level difference between pixel x[6] of neighborhood 371 and pixel x[6] of neighborhood 373. If d[6] is zero, then uniform motion 306 is indicated. d[8] is the gray level difference between pixel x[8] of neighborhood 371 and pixel x[8] of neighborhood 373. If d[8] is zero, then uniform motion 308 is indicated. d[12] is the gray level difference between pixel x[12] of neighborhood 371 and pixel x[12] of neighborhood 373. If d[12] is zero, then uniform motion 312 is indicated.

In query step 433, a check is made to see if at least one of d[2], d[6], d[8] and d[12] is zero. If affirmative, then step 435 is performed. Otherwise, step 440 is performed.

In step 435, one-dimensional temporal filter 102 is selected from filter bank 100 to perform Y/C separation if d[2] is zero. Specifically, filter 102 is specifically adapted to filter uniform motion 302. Similarly, one-dimensional temporal filter 106 is selected from filter bank 100 to perform Y/C separation if d[6] is zero. Specifically, filter 106 is specifically adapted to filter uniform motion 306. Similarly, one-dimensional temporal filter 108 is selected from filter bank 100 to perform Y/C separation if d[8] is zero. Specifically, filter 108 is specifically adapted to filter uniform motion 308. Similarly, one-dimensional temporal filter 112 is selected from filter bank 100 to perform Y/C separation if d[12] is zero. Specifically, filter 112 is specifically adapted to filter uniform motion 312.

In step 440, measurements are performed to obtain d[4], d[5], d[9] and d[10], which are gray level differences. As shown, the gray level measurements are limited to the diagonal directions of pixel x[7]. Specifically, d[4] is the gray level difference between pixel x[4] of neighborhood 371 and pixel x[4] of neighborhood 373. If d[4] is zero, then uniform motion 304 is indicated. d[5] is the gray level difference between pixel x[5] of neighborhood 371 and pixel x[5] of neighborhood 373. If d[5] is zero, then uniform motion 305 is indicated. d[9] is the gray level difference between pixel x[9] of neighborhood 371 and pixel x[9] of neighborhood 373. If d[10] is zero, then uniform motion 310 is indicated. d[10] is the gray level difference between pixel x[10] of neighborhood 371 and pixel x[10] of neighborhood 373. If d[10] is zero, then uniform motion 310 is indicated.

Continuing with step 440, measurements are also performed to obtain d[1], d[3], d[11] and d[13], which are gray level differences. As shown, the gray level measurements are limited to the diagonal directions of pixel x[7]. Specifically, d[1] is the gray level difference between pixel x[1] of neighborhood 371 and pixel x[1] of neighborhood 373. If d[1] is zero, then uniform motion 301 is indicated. d[3] is the gray level difference between pixel x[3] of neighborhood 371 and pixel x[3] of neighborhood 373. If d[3] is zero, then uniform motion 303 is indicated. d[11] is the gray level difference between pixel x[11] of neighborhood 371 and pixel x[11] of neighborhood 373. If d[11] is zero, then uniform motion 311 is indicated. d[13] is the gray level difference between pixel x[13] of neighborhood 371 and pixel x[13] of neighborhood 373. If d[13] is zero, then uniform motion 313 is indicated.

In query step 443, a check is made to see if at least one of d[4], d[5], d[9], d[10] d[1], d[3], d[11] and d[13] is zero. If affirmative, then step 445 is performed. If affirmative, then step 455 is performed. Otherwise, none of uniform motions 301–313 is considered to occur. As such, step 220 of flow chart 200 (see FIG. 2) is performed.

In step 445, one-dimensional temporal filter 104 is selected from filter bank 100 to perform Y/C separation if d[4] is zero. Specifically, filter 104 is specifically adapted to filter uniform motion 304. Similarly, one-dimensional temporal filter 105 is selected from filter bank 100 to perform Y/C separation if d[5] is zero. Specifically, filter 105 is specifically adapted to filter uniform motion 305. Similarly, one-dimensional temporal filter 109 is selected from filter bank 100 to perform Y/C separation if d[9] is zero. Specifically, filter 109 is specifically adapted to filter uniform motion 309. Similarly, one-dimensional temporal filter 110 is selected from filter bank 100 to perform Y/C separation if d[10] is zero. Specifically, filter 110 is specifically adapted to filter uniform motion 310.

Continuing with step 445, one-dimensional temporal filter 101 is selected from filter bank 100 to perform Y/C separation if d[1] is zero. Specifically, filter 101 is specifically adapted to filter uniform motion 301. Similarly, one-dimensional temporal filter 103 is selected from filter bank 100 to perform Y/C separation if d[3] is zero. Specifically, filter 103 is specifically adapted to filter uniform motion 303. Similarly, one-dimensional temporal filter 111 is selected from filter bank 100 to perform Y/C separation if d[11] is zero. Specifically, filter 111 is specifically adapted to filter uniform motion 311. Similarly, one-dimensional temporal filter 113 is selected from filter bank 100 to perform Y/C separation if d[13] is zero. Specifically, filter 113 is specifically adapted to filter uniform motion 313.

Referring now to FIG. 5, a flow chart 500 is shown providing details of the second, third and fourth stages of the selection method in accordance with one embodiment of the invention. Flow chart 500 outlines steps for selecting a filter from filter bank 100 if none of uniform motions 301–313 is detected in the first processing stage of the selection method. A filter is selected according to the orientation of an edge in the three-dimensional sample space spanned by a horizontal axis, a vertical axis and a temporal axis. A motion can be represented as an edge in the sample space.

Specifically, in the current processing field, operation is performed to detect edge locations in the spatial domain (the sample space) horizontally or vertically with the four adjacent samples of the processing pixel. Then, edge detection is performed to calculate the C energy in the high frequency to the horizontal and the vertical direction respectively. The smaller amount of a direction in the spectral domain means that an edge locates in the direction in the spatial domain. That is, in the current processing field, operation is performed to detect edge locations in the spatial domain horizontally or vertically with the four adjacent samples of the processing pixel.

Continuing with FIG. 5, steps 530, 540, 541–543, and 551–553 belong to the first processing stage of the filter selection method.

In step 530, three gray level differences dH, dV and dT are generated. Specifically, dH of a processing pixel is the gray level difference between the right-side pixel of the processing pixel and the left-side pixel of the processing pixel. .dV of the processing pixel is the gray level difference between the upper pixel of the processing pixel and the lower pixel of the processing pixel. .dT of the processing pixel is the gray level difference between pixel x[7] of neighborhood 371 and pixel x[7] of neighborhood 373.

In query step 540, a search is made to find min(dH, dV, dT), the minimum of dH, dV and dT. If dH is min(dH, dV, dT), then query step 541 is performed. If dV is min(dH, dV, dT), then query step 542 is performed. If dT is min(dH, dV, dT), then query step 543 is performed. If dH is less than dT and equal to dV, then step . . . . Is performed. If dH is less than dV and equal to dT, then step . . . is performed. If dV is less than dH and equal to dT, then step . . . is performed.

In query step 541, a check is made to see if dH is less than a pre-defined threshold value. If affirmative, then step 551 is performed. Otherwise, query step 561 is performed.

In query step 542, a check is made to see if dV is less than a pre-defined threshold value. If affirmative, then step 552 is performed. Otherwise, query step 562 is performed.

In query step 543, a check is made to see if dT is less than a pre-defined threshold value. If affirmative, then step 553 is performed. Otherwise, query step 563 is performed.

In step 551, one-dimensional horizontal comb filter 151 is selected from filter bank 100 to perform Y/C separation.

In step 552, one-dimensional vertical comb filter 152 is selected from filter bank 100 to perform Y/C separation.

In step 553, a one-dimensional temporal comb filter is selected from filter bank 100 to perform Y/C separation. Specifically, this filter is specified with three filter coefficients. Thus, this filter is different from each of two-tab filters 101–113.

Steps 561–563, 571–573 and 581–583 belong to the third processing stage of the filter selection method. For the diagonal edge detection, the spectral energy is bounded by the three two-dimensional filters; that is, a horizontal-vertical, a horizontal-temporal, and a vertical-temporal filter. The selection depends on the relative lengths of the spectral band in the directions. On the two shorter lengths in the directions among the three directions, an adequate two-dimensional filter bounds the spectral energy. The spectral limitation has the same effects as the diagonal edge detection in the directions. Therefore, the spectral limitation by the three two-dimensional filters can detect diagonal edges.

In query step 561, a check is made to see if min(dV, dT) is less than a predefined threshold value. If affirmative, then step 571 is performed. Otherwise, step 590 is performed.

In query step 562, a check is made to see if min(dH, dT) is less than a pre-defined threshold value. If affirmative, then step 572 is performed. Otherwise, step 590 is performed.

In query step 563, a check is made to see if min(dH, dV) is less than a pre-defined threshold value. If affirmative, then step 573 is performed. Otherwise, step 590 is performed.

In query step 571, a search is made to find min(dV, dT), the minimum of dV and dT. If dV is min(dV,dT), then step 583 is performed. If dT is min(dV, dT), then query step 581 is performed. If dV is equal to dT, then step 581 is performed.

In query step 572, a search is made to find min(dH, dT), the minimum of dH and dT. If dH is min(dH,dT), then query step 583 is performed. If dT is min(dH, dT), then query step 582 is performed. If dH is equal to dT, then step 582 is performed.

In query step 573, a search is made to find min(dH, dV), the minimum of dH and dV. If dH is min(dH,dV), then query step 581 is performed. If dV is min(dH, dV), then query step 582 is performed. If dH is equal to dV, then step 581 is performed.

In step 581, two-dimensional horizontal-temporal comb filter 161 is selected from filter bank 100 to perform Y/C separation.

In step 582, two-dimensional horizontal-vertical comb filter 153 is selected from filter bank 100 to perform Y/C separation.

In step 583, two-dimensional vertical-temporal comb filter 162 is selected from filter bank 100 to perform Y/C separation.

Step 590 belongs to the fourth processing stage of the filter selection method. Specifically, if none of the previous ways works due to edges in fast motion, then for the last choice, the three-dimensional spatial-temporal filter can limit the spectral energy in any directions. The situation can happen in the case of fast moving edges. The edges have a high spatial frequency and the moving objects have a high temporal frequency. Therefore, the fast moving edges have a high three-dimensional spatial-temporal frequency. That makes the Y/C separation works difficult because the high frequency terms of the Y are likely to overlap with those of the C. Fortunately fast moving objects can be hardly seen in details with human eyes. Therefore, one solution for the case of fast moving edges is acceptable that a three-dimensional spatial-temporal filter limits spectral bands to all directions.

In step 590, three-dimensional spatial-temporal filter 1** is selected from filter bank 100 to perform Y/C separation.

As understood herein, the high frequency term in the Y energy can overlap with the modulated C energy. Therefore, the above method to detect edge locations depends on the frequency characteristic of a band-pass filter. That is why the band-pass filter has 5-tap coefficients instead of ordinary 3-tap ones. The frequency characteristic of a 5-tap band-pass filter is considerably sharp to pick up the C energy only. Then, with the C energy the edge location detection is more accurate. However, the edge location detection is limited to the horizontal and the vertical direction only.

The foregoing descriptions of specific embodiments of the invention have been presented for purposes of illustration and description. They are not intended to be exhaustive or to limit the invention to the precise forms disclosed. Obviously, many modifications and variations are possible in light of the above teaching. The embodiments were chosen and described in order to explain the principles and the application of the invention, thereby enabling others skilled in the art to utilize the invention in its various embodiments and modifications according to the particular purpose contemplated. The scope of the invention is intended to be defined by the claims appended hereto and their equivalents.

What is claimed is:

1. A method for separating luminance (Y) and chrominance (C) of a composite TV digital signal, said method comprising the steps of:
   a) analyzing said composite signal to search for one of a plurality of pre-defined motions;
   b) in response to a pre-defined motion being detected, filtering the spectral energy of said detected pre-defined motion by a one-dimensional temporal comb filter selected from a filer bank;
   c) in response to no pre-defined motion being detected, analyzing said signal by searching for an edge in a three-dimensional sample space of said signal, wherein said sample space is spanned by a horizontal axis, a vertical axis and a temporal axis, and wherein said edge represents a motion encoded in said signal;
   d) in response to said edge being detected, selecting a filter of said filter bank in accordance with the orientation of said edge to filter the spectral energy of said motion;
   e) in response to no edge being detected, selecting a three-dimensional spatial-temporal comb filter of said filter bank.

2. The method of claim 1, wherein said step (c) further comprising the steps of:
   c1) measuring gray level differences (dT, dH, and dV) between two horizontal neighbor pixels of a processing pixel, two vertical neighbor pixels of said processing pixel and two temporal neighbor pixels of said processing pixel, said dT, dH and dV adapted to indicate the presence of said edge respectively along the horizontal direction, vertical direction and temporal direction of said sample space;
   c2) in response to the minimum of dH, dV and dT less than a first threshold value, selecting a one-dimensional comb filter to filter spectral energy corresponding to said edge; and
   c3) in response to the minimum of dH, dV and dT equal or greater than said first threshold value, searching for a diagonal edge in said sample space; and
   c4) in response to a diagonal edge being detected, selecting a two-dimensional comb filter to filter spectral energy corresponding to said diagonal edge, said two-dimensional comb filter can be a two-dimensional horizontal-vertical comb filter, a two-dimensional horizontal-temporal comb filter, or a two-dimensional vertical-temporal comb filter.

3. A method for separating luminance (Y) and chrominance (C) of a composite TV digital signal, said method comprising:
   a) searching for motion encoded in said signal, wherein a motion is represented as an edge in a three-dimensional sample space of said signal, said sample space spanned by a horizontal axis, a vertical axis and a temporal axis;
   b) in response to detecting a first motion that matches one of a plurality of pre-defined motions, selecting a one-dimensional temporal filter of a filter bank to filter spectral energy corresponding to a first edge that represents said first motion in said sample space;
   c) in response to detecting a second motion that is different from any of said n pre-defined motions, selecting a filter of said filter bank to filter spectral energy corresponding to a second edge, said filter selected according to the orientation of said second edge in said sample space.

4. The method of claim 1, wherein in said step c) said filter is selected by following a filter selection procedure that selects said filter according to the orientation of said second edge.

5. A method for separating luminance (Y) and chrominance (C) from a composite TV digital signal, said method comprising the steps of:
   a) searching for a plurality of pre-defined motion cases, said plurality of pre-defined motion cases comprises the motionless case;
   b) in response to finding at least one of said pre-defined motion cases, performing Y/C separation of said composite TV digital signal by selecting a one-dimensional (1D) temporal comb filter from a filter bank, said filter bank comprises a plurality of 1D temporal comb filters in one-to-one correspondence with said plurality of pre-defined motion cases;
   c) in response to finding none of said pre-defined uniform motion cases, performing Y/C separation of said composite TV digital signal by selecting according to a selection method a filter from the portion of said filter bank that comprises a 1D horizontal (H) comb filter, a 1D vertical (V) comb filter, a two-dimensional (2D) horizontal-vertical (HV) comb filter, a 2D horizontal-temporal (HT) comb filter, a 2D vertical-temporal (VT) comb filter, a 3D horizontal-vertical-temporal (HVT) comb filter.

6. The method of claim 5, wherein said plurality of pre-defined motion cases comprise uniform motions, and wherein one of said plurality of pre-defined uniform motion cases is motionless.

7. The method of claim 5, wherein said plurality of said one-dimensional temporal filters comprises 2-tab 1D temporal comb filters.

8. The method of claim 5, wherein in said step c) said portion of said filter bank further comprises a 3-tab 1D temporal comb filter.

9. The method of claim 5, wherein in said step c) said selection method comprises the steps of:
   c1) generating min(dH, dV, dT), wherein dH is a gray level difference between the two horizontal neighboring pixels of a processing pixel of a current field, wherein dV is a gray level difference between the two vertical neighboring pixels of said processing pixel, wherein said dT is a gray level difference between the previous field pixel and the next field pixel of said processing pixel;
   c2) in response to at least one of said three gray level differences being less than a first pre-defined threshold value, performing Y/C separation by selecting one of said 1D (H) comb filter and 1D (V) comb filter;
   c3) in response to none of said three gray level differences being less than said first pre-defined threshold value, and in response to two of said gray level differences being less than a second pre-defined threshold value, performing Y/C separation by selecting one of said 2D (HV) comb filter, 2D (HT) comb filter, and 2D (VT) comb filter; and
   c4) in response to none of said three gray level differences being less than said first pre-defined threshold value, and in response to none of two of said gray level differences being less than a second pre-defined threshold value, performing Y/C separation by selecting said 3D (HVT) filter.

10. A filter bank for a TV composite signal, said filter bank comprising:
    an one-dimensional (1D) temporal comb filter adapted to perform Y/C separation for a motionless image;
    a plurality of 1D temporal comb filters adapted to perform Y/C separation by limiting spectral energy associated with an image motion detected having a pre-defined uniform velocity;
    a plurality of two-dimensional (2D) comb filters comprising:
        a 2D spatial (HV) comb filter adapted to limit spectral energy along horizontal and vertical frequency axes of a 3D spectral space of said signal,
        a 2D spatial-temporal (HT) comb filter adapted to limit spectral energy along horizontal and temporal frequency axes of said 3D spectral space, and
        a 2D spatial-temporal (VT) comb filter adapted to limit spectral energy along vertical and temporal frequency axes of said 3D spectral space; and
    a three-dimensional (3D) spatial-temporal (HVT) comb filter adapted to limit spectral energy along horizontal, vertical and temporal frequency axes of said 3D spectral space.

11. A color TV decoder for a TV composite signal, said color decoder comprising:
    a motion detection unit adapted to detect any of a plurality of pre-defined velocities from a set of gray level differences; and
    a filter bank coupled to said motion detection unit, said filter bank comprising:
        an one dimensional (1D) temporal comb filter adapted to filter a motionless image detected by said motion detection unit;
        a first plurality of 1D temporal comb filters adapted to filter an image motion detected by said motion detection unit as having a velocity that is equal to one of said plurality of pre-defined velocities;
        a second plurality of 1D comb filters adapted to limit spectral energy along one of the three frequency axes of a spectral space;
        a third plurality of two-dimensional (2D) comb filters adapted to filter an image by limiting spectral energy along two of said three frequency axes; and
        a three-dimensional (3D) comb filter adapted to filter an image by limiting spectral energy along all of said three frequency axes.

12. The color decoder of claim 11, wherein said set of gray level differences are generated between a first plurality of pixels in a previous field of a current processing field and a second plurality of pixels in a next field of said current processing field.

13. A filter bank for filtering a TV composite signal, said filter bank comprising:

- a two-dimensional (2D) spatial horizontal-vertical (HV) comb filter adapted to be activated to filter spectral energy associated with a first edge in a two-dimensional sample space spanned by a horizontal axis and a vertical axis;
- a 2D spatial-temporal (HT) comb filter adapted to be activated to filter spectral energy associated with a horizontal motion, wherein said horizontal motion is represented as a second edge in a two-dimensional sample space spanned by said horizontal axis and a temporal axis; and
- a 2D spatial-temporal (VT) comb filter adapted to be activated to filter spectral energy associated with a vertical motion, wherein said vertical motion is represented as a third edge in a two-dimensional sample space spanned by said vertical axis and said temporal axis; and
- a three-dimensional (3D) spatial-temporal (HVT) comb filter adapted to be activated to filter spectral energy associated with a motion that cannot be properly filtered with said above filters.

14. The filter bank of claim 13, further comprising:

- an one-dimensional (1D) temporal comb filter adapted to be activated to filter a motionless image;
- m 1D temporal comb filters adapted to be activated to filter spectral energy associated respectively with m pre-defined uniform motions, wherein m>1.

15. A filter bank for filtering a TV composite signal, said filter bank comprising:

- a first filter set comprising k one-dimensional (1D) temporal comb filters, wherein a filter from said first filter set is adapted to be selected to filter said signal in a first stage of processing said signal, wherein said k>1;
- a second filter set comprising a 1D horizontal (H) comb filter and a 1D vertical (V) comb filter, wherein a filter from said second filter set is adapted to be selected to filter said signal in a second stage of processing said signal if no filter is selected in said first stage;
- a third filter set comprising a two-dimensional (2D) horizontal-vertical (HV) comb filter, a 2D horizontal-temporal (HT) comb filter and a 2D vertical-temporal (VT) filter, wherein a filter from said third filter set is adapted to be selected to filter said signal in a third stage of processing said signal if no filter is selected in said second stage; and
- a fourth filter set comprising a three-dimensional (3D) horizontal-vertical-temporal (HVT) comb filter, wherein said 3D (HVT) comb filter is selected to filter said signal in a fourth stage of processing said signal if no filter is selected in said third stage, and wherein the orientation of an edge in a three-dimensional sample space of said signal is used for filter selection.

* * * * *

UNITED STATES PATENT AND TRADEMARK OFFICE
CERTIFICATE OF CORRECTION

PATENT NO. : 6,774,954 B1  
DATED : August 10, 2004  
INVENTOR(S) : Lee

It is certified that error appears in the above-identified patent and that said Letters Patent is hereby corrected as shown below:

<u>Title page,</u>  
Item [57], ABSTRACT,  
Line 4, "as the effect" should read -- as the same effect --.  
Line 5, "to the section rule" should read -- to the selection rule --.  
Line 6, "this applications, the" should read -- this application, the --.

<u>Column 3,</u>  
Line 28, "spatial-temporal (T) comb" should read -- spatial-temporal (HT) comb --.

Signed and Sealed this

Twenty-first Day of June, 2005

JON W. DUDAS  
*Director of the United States Patent and Trademark Office*